(12) United States Patent
Bae et al.

(10) Patent No.: US 8,404,111 B2
(45) Date of Patent: Mar. 26, 2013

(54) FLUIDIZED MEMBRANE BIOREACTOR

(75) Inventors: Jae-Ho Bae, Seoul (KR); Jeong-Hwan Kim, Incheon (KR); Perry L. McCarty, Stanford, CA (US)

(73) Assignee: INHA Industry Partnership Institute, Incheon (KR)

( * ) Notice: Subject to any disclaimer, the term of this patent is extended or adjusted under 35 U.S.C. 154(b) by 0 days.

(21) Appl. No.: 13/353,711

(22) Filed: Jan. 19, 2012

(65) Prior Publication Data

US 2012/0118808 A1 May 17, 2012

Related U.S. Application Data

(63) Continuation of application No. PCT/KR2010/001440, filed on Mar. 8, 2010.

(51) Int. Cl.
C02F 3/08 (2006.01)

(52) U.S. Cl. .......................... 210/151; 210/196; 210/617

(58) Field of Classification Search .................. 210/150, 210/151, 256, 616, 617, 631, 194, 196
See application file for complete search history.

(56) References Cited

U.S. PATENT DOCUMENTS

| | | | | |
|---|---|---|---|---|
| 4,762,612 A | * | 8/1988 | Yoda et al. | 210/150 |
| 4,869,815 A | * | 9/1989 | Bernard et al. | 210/151 |
| 5,116,505 A | * | 5/1992 | Lourens et al. | 210/617 |
| 5,618,411 A | * | 4/1997 | Donner et al. | 210/150 |
| 6,007,712 A | * | 12/1999 | Tanaka et al. | 210/151 |
| 6,866,788 B1 | * | 3/2005 | Baig et al. | 210/150 |
| 2006/0186041 A1 | * | 8/2006 | Dempsey | 210/617 |
| 2010/0200500 A1 | * | 8/2010 | Rezania et al. | 210/150 |

FOREIGN PATENT DOCUMENTS

| | | | |
|---|---|---|---|
| JP | 07-328624 A | | 12/1995 |
| JP | 09-57289 | * | 3/1997 |
| JP | 09-308883 A | | 12/1997 |
| JP | 2008-264664 | * | 11/2008 |
| KR | 10-0230172 B1 | | 8/1999 |
| KR | 10-0297178 A | | 9/2001 |
| KR | 10-0339017 A | | 5/2002 |

OTHER PUBLICATIONS

Machine translation of JP09-308883, Dec. 1997.*
Machine translation of JP07-328624, Dec. 1995.*
Machine translation of JP 09-57289, Mar. 1997.*
Machine translation of JP 2008-264664, Nov. 2008.*

* cited by examiner

*Primary Examiner* — Christopher Upton
(74) *Attorney, Agent, or Firm* — Reinhart Boerner Van Deuren P.C.

(57) ABSTRACT

A fluidized membrane bioreactor comprising a bioreactor including biochemically active organisms; fluidized particles which is a support media to be attached by the organisms; and membranes which permit treated water to pass through except the organisms, wherein the fluidized particles are in direct contact with the membranes. The membranes are installed internally or externally to the bioreactor. The particles may be granular activated carbon or other suitable materials. The fluidized particles serve not only as support media for microorganisms, but also as media for sorption or otherwise retention of matter that can cause membrane fouling and as an abrasive material for cleaning the membrane surface.

8 Claims, 4 Drawing Sheets

FLUIDIZED MEMBRANE BIOREACTOR

CROSS-REFERENCE TO RELATED PATENT APPLICATIONS

This patent application is a continuation of International application No. PCT/KR2010/001440 filed on Mar. 8, 2010, the teachings and disclosure of which are hereby incorporated in their entirety by reference thereto.

FIELD OF THE INVENTION

The invention relates to fluidized membrane bioreactors which combine a fluidized-bed biofilm reactor with membrane filtration so that the bioreactor can achieve a high efficiency of wastewater treatment together with ease in maintenance.

BACKGROUND OF THE INVENTION

Bioreactors for wastewater treatment are classified as dispersed-growth reactors and biofilm reactors.

In the dispersed-growth reactors, such as the activated sludge process, the biomass exists usually as suspended flocs. In order to reduce reactor volume, a high biomass concentration must be maintained in the reactor, in order to obtain this, biomass recycle from a settling tank is usually employed. This type of reactor is not usually used for anaerobic treatment of low-strength wastewater because of the relatively short solids retention time that results.

Biofilm reactors are distinctive in their ability to achieve the high solids retention time needed for efficient anaerobic treatment because the biomass is retained in the reactor by attaching to the media surface. Such reactors include packed bed reactors having fixed media and fluidized bed reactors having fluidized media.

In the fluidized bed reactors, fluid flows at sufficient velocity, generally in an upflow manner, through a bed of particulate matter such as sand or granular activated carbon such that the particles are lifted and remain suspended in the fluid. Here, the downward force of gravity on the particles is just balanced by the upward velocity of the fluid flowing around the particles. Fluidized bed reactors have seen many environmental applications, particularly for removal of nitrate and perchlorate from wastewaters. Here, microorganisms grow as dense biofilms attached to the fluidized particles, permitting the maintenance of a large biomass concentration within the reactor as needed for high efficiency of treatment at short detention times on the order of minutes rather than hours that may be required in other types of reactors.

On the other hand, the dispersed-growth reactors have been equipped with membranes for the maintenance of a high concentration of microorganisms within the reactor, leading to high treatment efficiency at short detention times. Either microfiltration or ultra-filtration membranes have commonly been used for this purpose, permitting treated water to pass through the membrane while maintaining particulate matter of the size of microorganisms—about 1 μm in size—to remain within the reactor. Because of the exclusion of such small particulate material from the reactor effluent, the effluent tends to be quite clean and can be disinfected readily, reaching a quality when treating municipal wastewaters that is adequate for safe use for irrigation of food crops. This represents an advantage over a traditional wastewater treatment system, which to meet similar effluent quality standards generally requires in addition to the biological reactor, a final settling tank to remove larger particulate matter and a multi-media filtration step to remove smaller ones of bacterial size. The advantage of the membrane bioreactor in this case is a treatment system that uses much less overall treatment system volume and requires a much smaller space, that is, it has a smaller footprint.

However, membrane fouling has been a serious problem affecting system performance in membrane bioreactors. Membrane fouling is caused by deposition of foulant materials on membrane surface and/or adsorption of them into membrane pore matrix. Membrane fouling decreases membrane performance due to increasing hydraulic resistance across the membrane, thereby increasing capital and operational costs subsequently. There have been many different approaches to reduce membrane fouling in membrane bioreactors. The common approach currently used in membrane bioreactor systems is the introduction near the membranes of high turbulence and cross-flow created by the introduction of air or recycled biogas below the membranes. While reasonably effective, this has a high energy cost. In addition, back pulsing of liquid or gas through the membrane and periodic cleaning are common practices, which also require high cost.

Aerobic treatment is the most common biological treatment system for wastewaters, but requires significant energy for air injection. Anaerobic processes, however, operate without air or oxygen introduction, and instead produce useful energy in the form of biogas. A specific need of anaerobic treatment is a long solids retention time (SRT) to prevent washout from the reactor of slow-growing methane-forming anaerobic bacteria. Membrane bioreactors can be advantageous for anaerobic treatment of dilute wastewaters such as domestic sewage in that the membranes prevent washout of anaerobic bacteria and thus can provide the long SRT needed, while operating at short hydraulic detention times as required to reduce reactor size and cost. The higher current energy requirement with membrane treatment, however, tends to offset the advantage.

Even though much research has been conducted in an effort to reduce this energy requirement, the needs to reduce the energy requirements further still exists.

SUMMARY OF THE INVENTION

Accordingly, an objective of the present invention is to provide wastewater treatment systems that permit more effective biological treatment of domestic as well as industrial wastewaters, and that also reduce the associated energy use and maintenance requirements.

The wastewater treatment system of the present invention is characterized in that it combines a fluidized bed reactor with membrane filtration. The fluidized membrane bioreactor (FMB) of the present invention comprises a bioreactor including biochemically active organisms; fluidized particles which is a support media to be attached by the organisms; and membranes that permit treated water to pass, but not the organisms. The fluidized particles come into direct contact with the membranes.

The fluidized membrane bioreactor of the present invention can be used in one of two different modes: one in which the membranes are placed within the biological reactor itself, and the other in which membrane filtration is carried out in a separate step following the biological treatment system.

The membranes may be of different types such as hollow fiber membranes, tubular membranes, or flat sheet membranes. The fluidized particles may be sand, or granular activated carbon, or other materials as commonly used in traditional fluidized bed reactors. For example, granular activated carbon (GAC) which is larger than powder activated carbon (PAC) generally has a size of 0.3 mm or more. Particularly, GAC in size of 0.3 to 0.7 mm is preferable. The GAC of this size is effective in both adsorbing or otherwise holding particulate matter, and preventing membrane clogging by scouring against the membranes.

The fluidized membrane bioreactor can be effectively used with anaerobic as well as aerobic treatment systems.

The advantages of combining a fluidized bed reactor with membrane filtration are not only that biomass retention is improved, but also the clogging of membranes through which treated effluent passes is significantly reduced through the combined sorption and scouring action of the fluidized particles in the reactor, which are in direct contact with the membranes. Therefore, the normal action of a fluidized bed system helps reduce a major problem with normal membrane bioreactors in an energy efficient manner. Therefore, additional gas injection for vigorous agitation demanding much energy is no longer required.

The fluidized membrane bioreactor of this invention is particularly applicable with anaerobic treatment in helping to achieve good wastewater treatment efficiency since it helps maintain a long SRT.

DETAILED DESCRIPTION OF THE INVENTION

Figure 1:
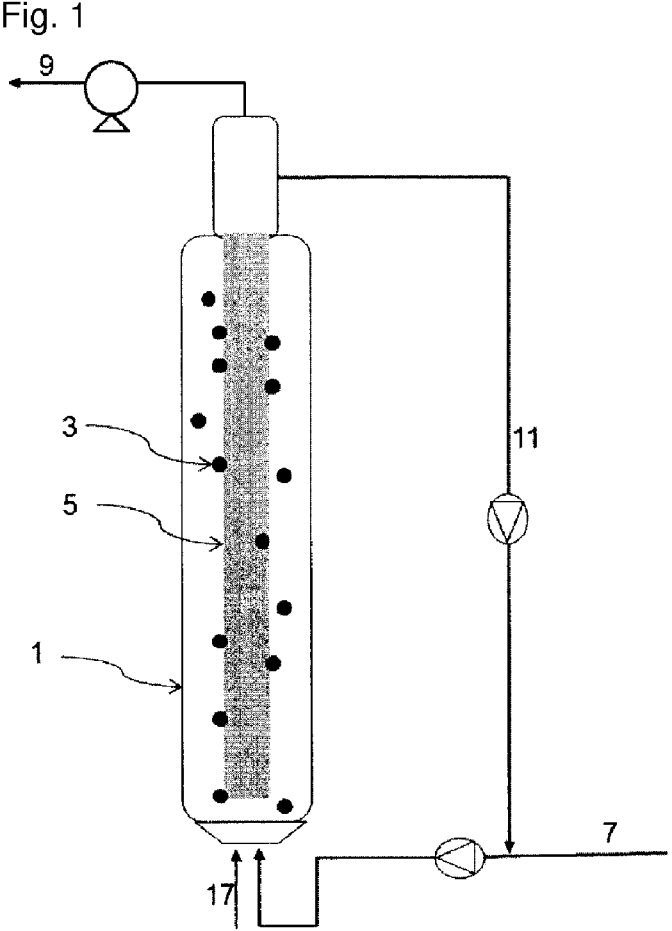
FIG. 1 is a schematic view of an embodiment of the FMB of the present invention in which membranes are installed inside of the bioreactor.

FIG. 1 is a schematic view of a preferable embodiment of the fluidized membrane bioreactor of the present invention, in which a bioreactor 1 including fluidized particles 3 is installed beside membranes 5.

The membranes 5 may be preferably hollow fiber membranes, tubular membranes or flat sheet membranes. For example, hollow fiber membranes would be held in a vertical position inside of the bioreactor 1. The fluidized bed particles 3 are fluidized by influent flow 7 in an upward direction and at the same time come into physical contact with the membranes 5 so that the physical movement on the membrane surfaces as well as biodegradation and sorption help to reduce membrane fouling.

The required upward velocity of fluid flow would be such as to fluidize the support media particles 5, causing a bed expansion over that in the bed's resting state of from 5 to 300%, but generally in the range of 25 to 150%.

The support media may be any particles that when in its wet state is heavier than water, having a specific gravity ranging from about 1.05 to 3, that is from dense plastic beads to sand grains, and having a size between 0.1 mm and 5 mm. A particularly effective support media would be granular activated carbon (GAC) with size range of 0.3 to 0.7 mm. Similar material has proven effective in full-scale fluidized bed bioreactors for contaminated water treatment for growth of microorganisms and degradation of harmful organic and inorganic trace contaminants. Typical upward fluid velocity for achieving 50 to 100% bed expansion with this material is on the order of 1 m/min.

The fluidized bed particles 5 serve the multiple functions of support media for microorganisms, a media for sorption or otherwise retention of fine particulate matter and soluble organic materials that tend to clog membranes, and as an abrasive material that helps clean the membrane surface through the physical action of its movement and through sorption from the membranes of attached particles.

After the filtration, the permeate 9 is produced from the membrane. Fluidization of particles to the degree desired is maintained by recycling the proper amount of fluid in the bioreactor 1 through line 11. This flow together with the influent flow 7 creates the necessary upward fluid velocity in the bioreactor 1 for fluidization.

Figure 2:
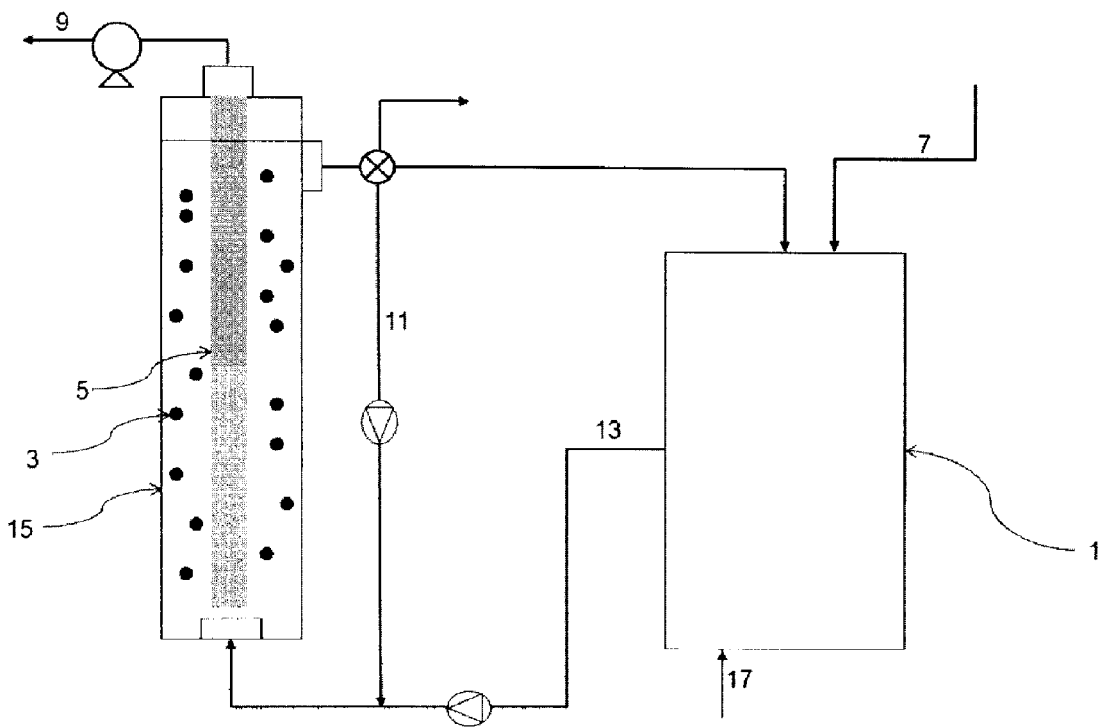
FIG. 2 is a schematic view of a further embodiment of the FMB of this invention in which membranes are installed outside of the bioreactor.

Although, in the example of the FIG. 1, the membranes are placed within the biological reactor itself, membrane filtration may be carried out in a separate step following the biological treatment system, and an embodiment of this structure is shown in FIG. 2.

In this embodiment, the influent 13, after biotreatment in a bioreactor 1, is introduced to a separate chamber 15 in which membranes 5 are installed. The influent 13 passes through the membranes 5 in chamber 15, and the fluidized particles 3 by the influent 13 mainly function as a media for sorption or otherwise retention of clogging matter and as an abrasive material for reducing membrane fouling.

When used in the external mode, the bioreactor 1 itself may be any one of several different possible designs such as a completely stirred tank reactor, a filter, an upflow sludge blanket reactor, a baffled reactor, a sequencing batch reactor, a fluidized bed reactor, or one of any other bioreactors that may presently be used or otherwise contemplated. The objective here is to use the fluidized system to reduce membrane fouling with small energy expenditure.

Figure 3:
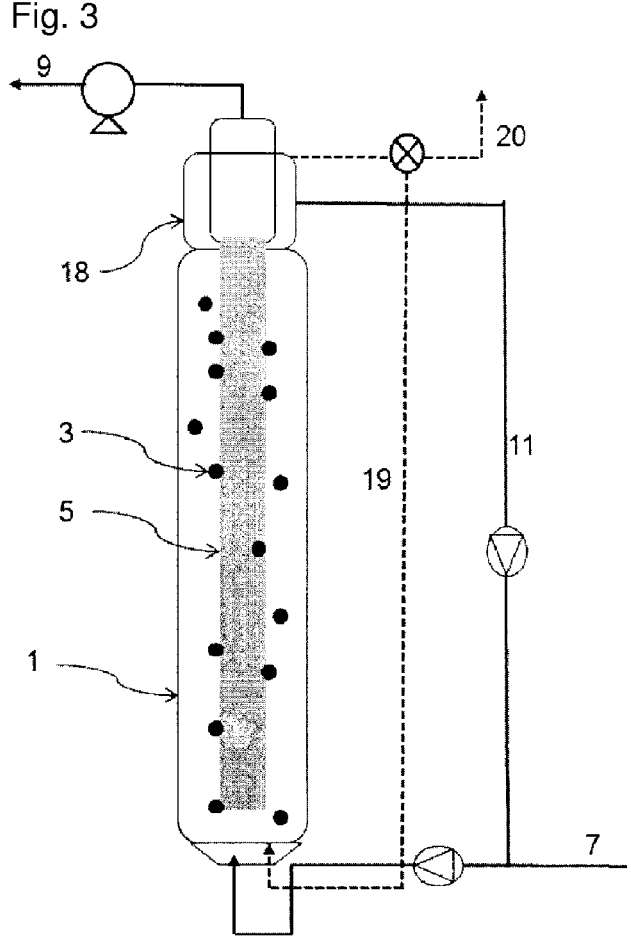
FIG. 3 is a schematic view of a variation of the embodiment shown in FIG. 1 which is used with an anaerobic treatment system.
Figure 4:
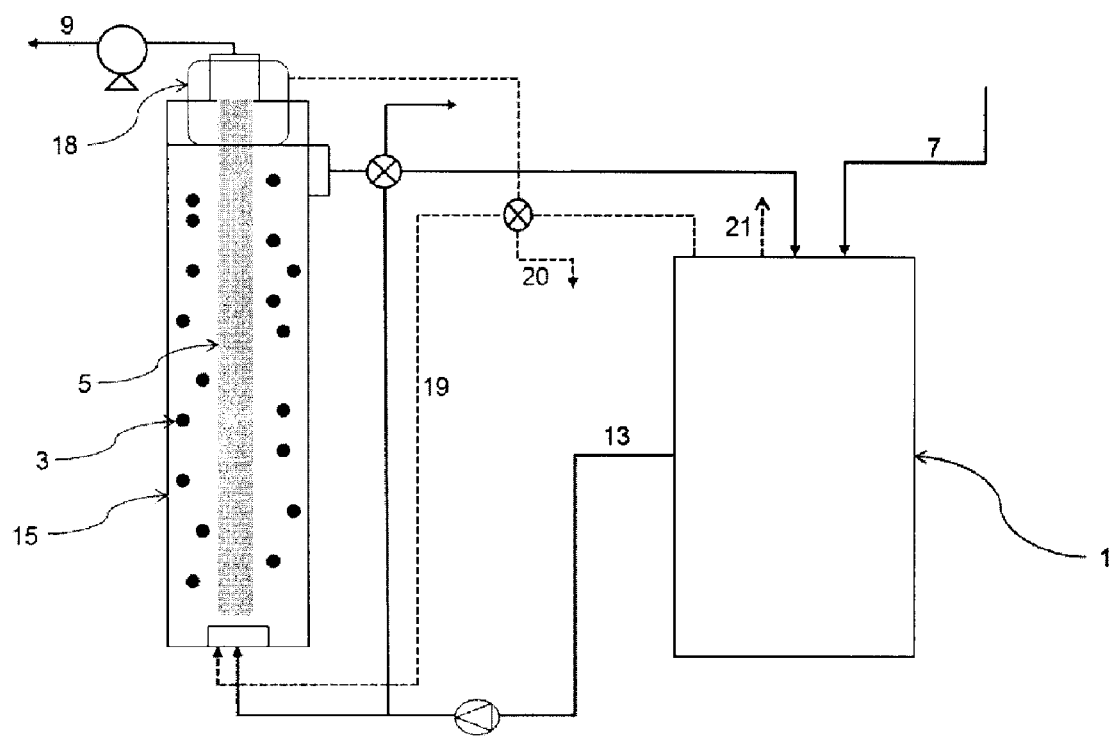
FIG. 4 is a schematic view of a variation of the embodiment shown in FIG. 2 which is used with an anaerobic treatment system.

The embodiments of the FIGS. 1 and 2 show the FMB used with an aerobic biological treatment system with aeration means 17. However, the FMB according to this invention can be used effectively with an anaerobic biological treatment system, the embodiments of which are shown in FIG. 3 and FIG. 4.

In those embodiments, aeration means are eliminated, and the biogas produced is separated by a gas separator 18. The separated gas may be either used to assist fluidization of the particles, through line 19, or discharged through line 20, 21.

Fluidized particles 3 allow the maintenance of a long SRT through the formation of a biofilm on the surface. In addition, the membrane 5 prevents washout of anaerobic bacteria and thus can provide further long SRT. Combining the fluidized bed and membrane reactors together helps maintain the long SRT required for an anaerobic process, enhances mass transfer of waste organics to the microorganisms, and reduces fouling potential of membranes in an energy-efficient biofuel-producing manner. Thus, the process of the present invention would be useful in an aerobic membrane bioreactor, and in addition would make anaerobic treatment a much more favorable process for treatment of dilute wastewaters than has been the case in the past.

Figure 5:
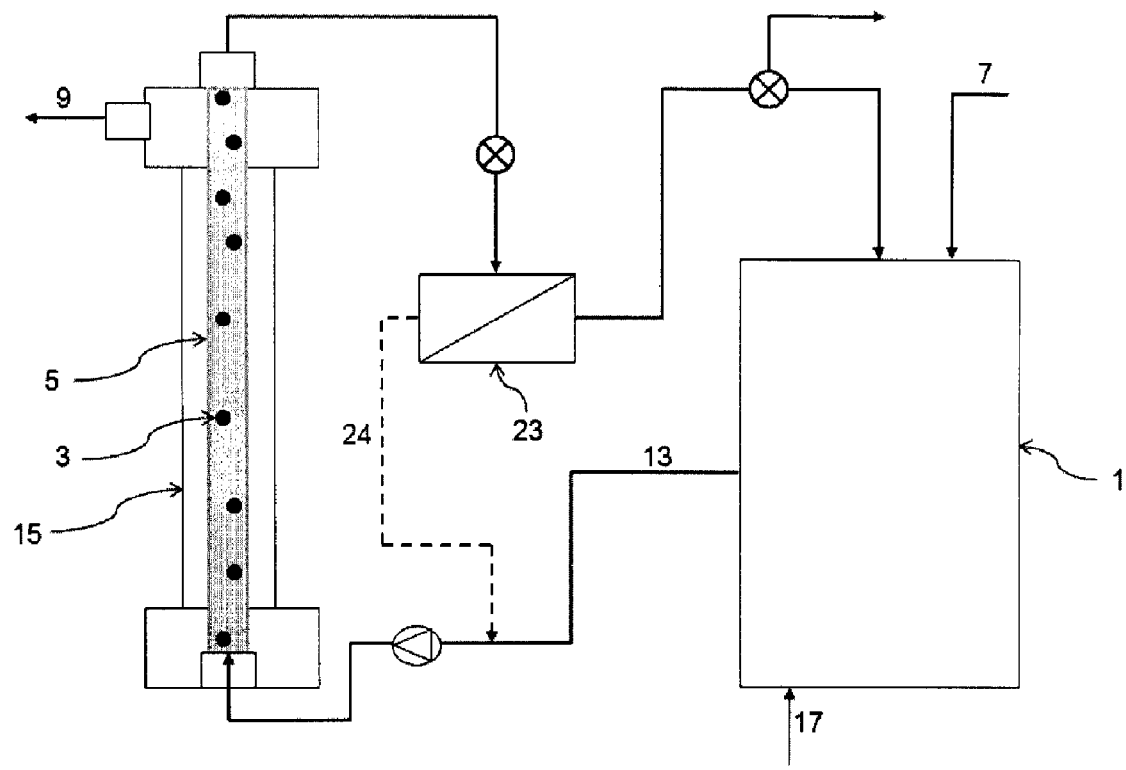
FIG. 5 is a schematic view of a further variation of the embodiment shown in FIG. 2.

FIG. 5 shows a further variation of the embodiment of FIG. 2. In this embodiment, the membrane 5 is a tubular membrane, and the abrasive particles 3 are fluidized inside of the membrane 5 for more effective membrane cleaning In order to prevent the loss of particles 5, for example GAC, in this embodiment, a GAC separator 23 may be attached additionally. The separated GAC 24 is introduced to the chamber together with the influent 13.

Figure 6:
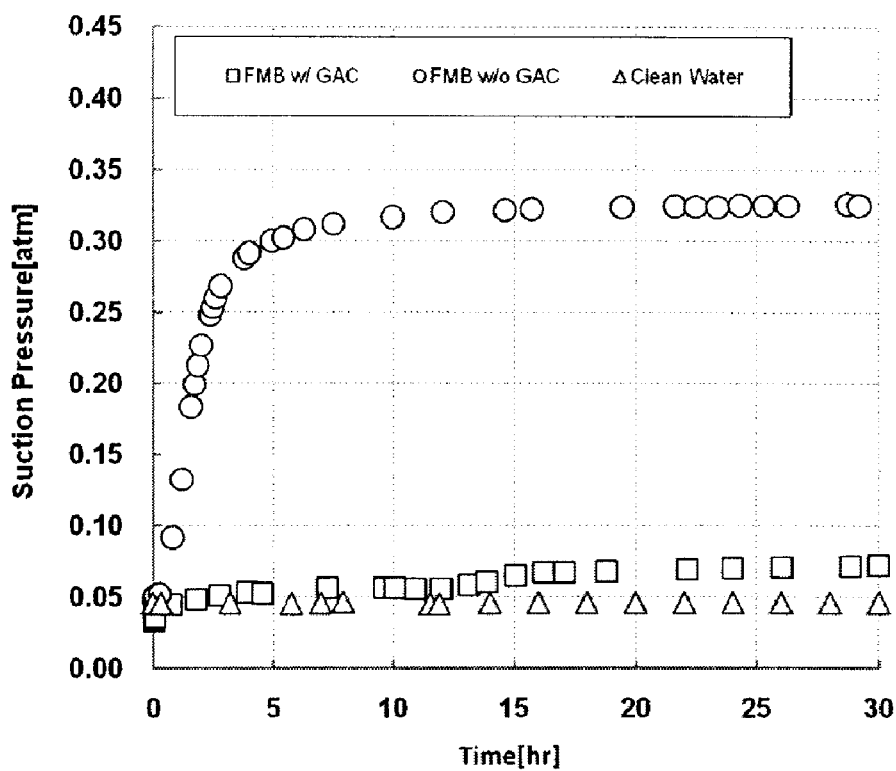
FIG. 6 and FIG. 7 are results showing changes in suction pressure with filtration time, which is obtained from the FMB shown in FIG. 4.
Figure 7:
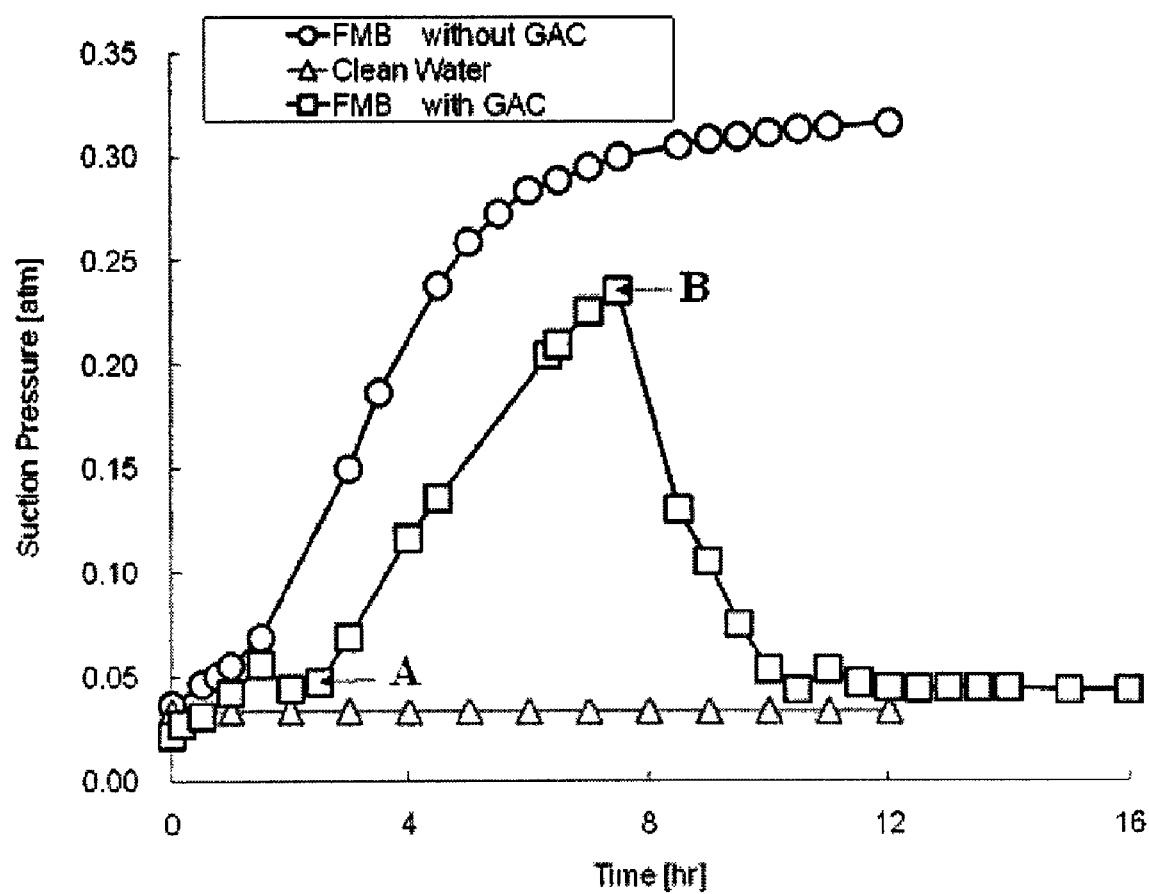

FIG. 6 is the result of an experiment to investigate effect of GAC on membrane fouling in the FMB according to the present invention. The FIG. 6 compares transient behavior of suction pressure as an indicator of membrane fouling at constant flux operation without GAC and with GAC as fluidizing media. The FMB used in this experiment is the type of FIG. 4, that is, the membrane module is installed outside of anaerobic bioreactor, and thus the membrane treats effluent from the bioreactor. Hollow-fiber membranes were used in this test. As for the FMB with GAC, the GAC was fluidized in the reactor continuously. FIG. 6 shows that the suction pressure (or membrane fouling) increases significantly as there is no GAC in the reactor. However, the transient behavior of suction pressure was observed to be almost similar to one obtained from using clean water as continuous fluidization of GAC was performed FIG. 7 also shows another result of the experiment to investigate effect of GAC on membrane fouling from the FMB according to the present invention. The FMB is same type of the reactor for the experiment used in FIG. 6. In this test, however, the fluidization of GAC was stopped at time A and started fluidizing at time B in the FMB rather than continuous fluidization of GAC in the reactor. FIG. 7 shows that the suction pressure increases when the fluidization of GAC is stopped. However it decreases rapidly almost close to the suction pressure level obtained from using as clean water in the reactor as the fluidization of GAC is started.

The effectiveness of membrane cleaning with the FMB is conspicuous from the results of these experiments.

The invention claimed is:

1. A fluidized membrane bioreactor comprising:
a bioreactor including biochemically active organisms;
fluidized particles as a support media attached by the organisms;
membranes which permit treated water to pass through but not the organisms;
wherein the fluidized particles are in direct contact with the membranes, and wherein the particles are primarily fluidized by liquid waste influent to the bioreactor without introduction of a gas.

2. The fluidized membrane bioreactor according to claim 1, wherein the membranes are installed internally in the bioreactor.

3. The fluidized membrane bioreactor according to claim 1, wherein the membranes are installed externally to the bioreactor.

4. The fluidized membrane bioreactor according to claim 1, wherein the fluidized particles are heavier than water when in their wet state, having a specific gravity ranging from about 1.05 to 3, and having a size between 0.1 mm and 5 mm.

5. The fluidized membrane bioreactor according to claim 4, wherein the fluidized particles are granular activated carbon.

6. The fluidized membrane bioreactor according to claim 1, wherein the membranes are selected from the group consisting of: hollow fiber membranes, tubular membranes, and flat sheet membranes.

7. The fluidized membrane bioreactor according to claim 1, wherein treatment in the bioreactor is anaerobic treatment.

8. The fluidized membrane bioreactor according to claim 1, wherein the particles are fluidized by introduction of the waste influent and recycled reactor fluid.

\* \* \* \* \*